United States Patent [19]

Clement, II et al.

[11] Patent Number: 4,808,221
[45] Date of Patent: Feb. 28, 1989

[54] PROCESS FOR THE RECOVERY AND SEPARATION OF ARSENIC FROM ANTIMONY

[75] Inventors: Thomas P. Clement, II, Perrysburg, Ohio; Taie Li, Salt Lake City, Utah; John P. Hager, Golden, Colo.

[73] Assignee: Asarco Incorporated, New York, N.Y.

[21] Appl. No.: 89,112

[22] Filed: Aug. 25, 1987

[51] Int. Cl.[4] .................................................. C22B 7/00
[52] U.S. Cl. .......................................... 75/63; 75/24; 75/69; 75/77; 423/88
[58] Field of Search ................... 75/63, 69, 24, 77, 84; 423/88

[56] References Cited

U.S. PATENT DOCUMENTS

| | | | |
|---|---|---|---|
| 486,330 | 11/1892 | Flury | 423/88 |
| 1,803,771 | 5/1931 | Rutherford | 75/77 |
| 4,194,904 | 3/1980 | Foerster et al. | 75/63 |
| 4,489,046 | 12/1984 | Peterson et al. | 423/88 |
| 4,578,254 | 3/1986 | Malmström | 423/88 |
| 4,626,279 | 12/1986 | Bjornberg et al. | 423/88 |

Primary Examiner—Melvyn J. Andrews
Assistant Examiner—David W. Schumaker
Attorney, Agent, or Firm—John J. Tomaszewski; Kenneth A. Koch

[57] ABSTRACT

Fume generated by roasting speiss is contacted with an oxygen-containing gas at an elevated temperature for a sufficient time to produce arsenic and antimony products which may be separated from each other by means such as condensation. Further, in the roasting of antimony-containing phases (such as speiss) the presence of arsenic can enhance the volatility of the antimony.

6 Claims, 4 Drawing Sheets

PROCESS FOR THE RECOVERY AND SEPARATION OF ARSENIC FROM ANTIMONY

BACKGROUND OF THE INVENTION

The present invention relates to the separation of arsenic from antimony and, more particularly, to the separation of arsenic from antimony from the fume generated by the roasting of speiss and to the enhanced volatility of antimony in the presence of arsenic.

Many ores contain significant amounts of arsenic and antimony in addition to other elements. Some ores, in particular lead ores, contain large amounts of copper and other speiss forming metals and are conventionally processed by roasting and sintering the ore concentrate and then smelting the sinter in a blast furnace. Molten lead bullion from the furnace may then be treated in a variety of ways to separate the lead from the other constitutents of the bullion. U.S. Pat. No. 4,404,026 shows both a conventional drossing purification operation whereby matte and speiss phases are separated from the bullion and an improved method to produce purer matte and speiss phases (i.e., matte and speiss containing less lead) by using sodium addition to the bullion. The disclosure of this patent is hereby incorporated by reference.

The matte phase is composed primarily of a PbS-$Cu_2S$ mixture while the speiss phase consists of $Cu_3As$, $Cu_3Sb$ and $Fe_2As$, usually intermingled with an additional emulsion of very fine PbS-$Cu_2S$ matte particles. The matte phase which contains, by weight, mostly copper, about 50%, and lead, about 11%, and small amounts of arsenic, antimony and precious metals, e.g., silver, is typically added to the copper converters in the copper circuit to recover the copper and produce blister copper.

While the invention will be directed to treating the arsenic and antimony fume generated by roasting speiss it will be apparent to those skilled in the art that the process also applies to other volatilized gases (fumes) and materials containing antimony and arsenic and to enhancing the volatilization of antimony from antimony-bearing materials.

The speiss phase contains, by weight, mostly copper, about 50–60%, lead about 8–12%, and a large percentage of the arsenic, antimony and silver of the lead ore. Normally the speiss is also added to the copper circuit at the copper roaster stage to recover the copper and silver values but the presence of the arsenic and antimony impurities leads to a build-up of these metals in the circuit and to environmental as well as impurity problems in the copper refining process. One practice is to dilute the level of these impurities by stockpiling the speiss and limiting the amount of speiss processed. This practice is uneconomical since the copper and silver are tied up in inventory instead of being produced into finished products.

In U.S. application No. 854,237 (filed Apr. 21, 1986), owned by the assignee of this invention, a process is disclosed for the separation, recovery and purification of arsenic and antimony from the speiss by a roasting operation and a leaching process. The disclosure of this application is incorporated herein by reference. The subject invention improves this roasting process by enabling recovery of separate arsenic and antimony products directly from the speiss fume without the need for a leaching step and recycle of an antimony residue to the lead circuit, and enhancing the volatilization of antimony during roasting due to the presence of arsenic.

Accordingly, it is an object of the invention to separate arsenic from antimony from fumes and other materials.

It is another object of the invention to separate arsenic from antimony from the fume generated by the roasting of speiss.

A further object of the invention is to provide a process for enhancing the separation of antimony from antimony bearing materials.

It is still another object of the invention to provide a lead ore treatment process whereby the recovery of the copper and silver in the ore is enhanced in the copper circuit by the removal of arsenic and antimony from the speiss.

Additional objects and advantages will be readily apparent as the invention is hereinafter described in detail.

SUMMARY OF THE INVENTION

The arsenic and antimony volatilized (fumed) from speiss by roasting the speiss in the presence of controlled amounts of a sulfur source and a carbon source are contacted with an oxygen containing gas, such as pure oxygen, oxygen enriched air or air to produce separable arsenic and antimony products. Separation will usually be effected by condensing the treated fume wherein the higher boiling point antimony oxide compounds will condense first and be separated from the arsenic oxide compounds.

The roasted speiss (calcine) is added to the copper circuit to recover the copper, silver and other metals present therein. Any residue from the fume oxidation operation other than recovered antimony and arsenic products is recycled to the lead circuit, e.g., at the sintering operation or to the blast furnace.

DETAILED DESCRIPTION OF THE INVENTION

Figure 1:
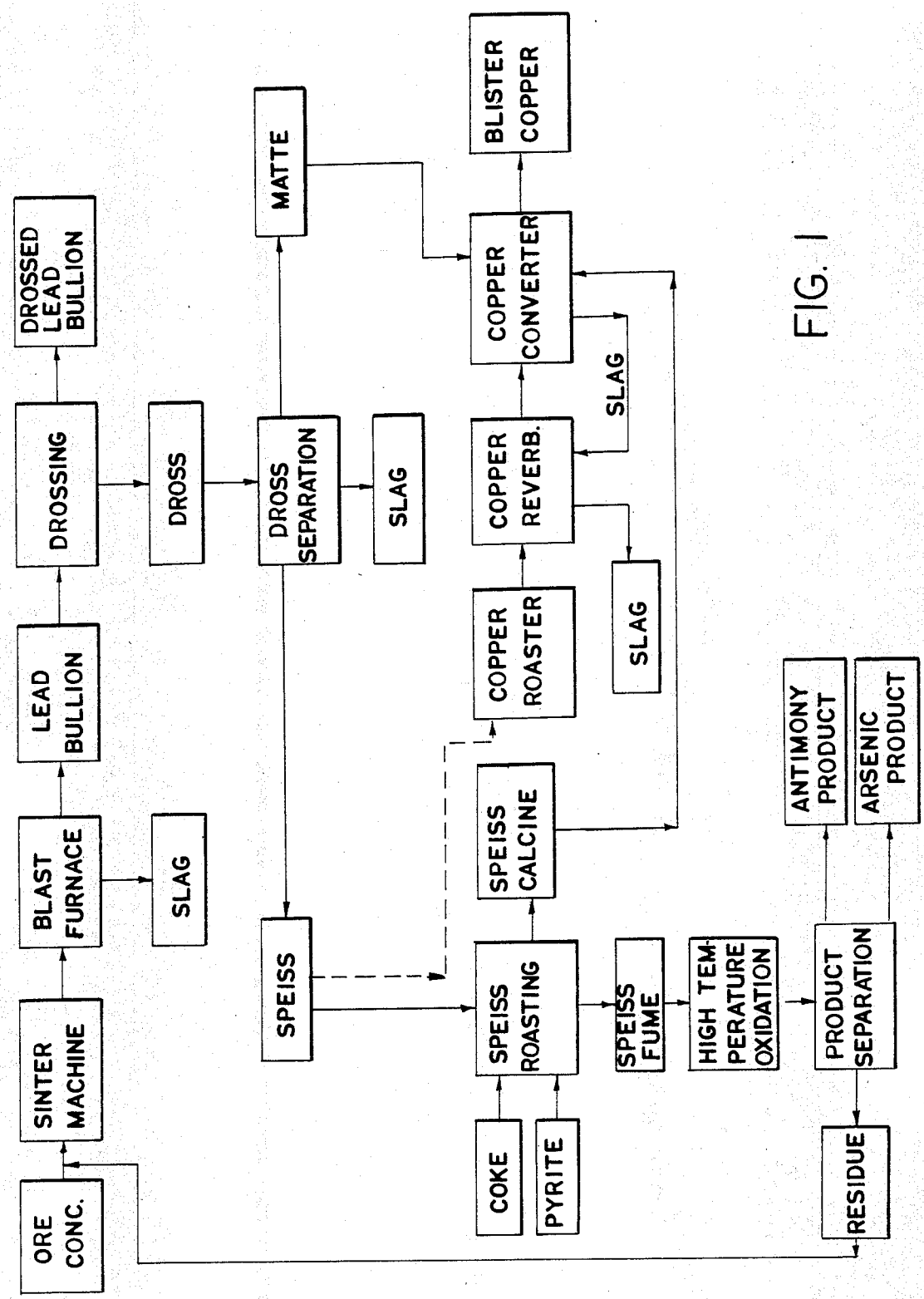
FIG. 1 is a diagrammatic flow sheet illustrating one embodiment of the process of this invention.

With regard to fumes generated by speiss roasting, the process in accordance with the invention can be employed to treat fumes generated from speisses from all sources, e.g., nickel ores, however, for convenience, the invention will be described with reference to a speiss obtained from a lead circuit containing speiss forming copper values. Typical compositions of these speisses vary widely and typically contain, by weight, about 50 to 60% copper, 8 to 12% lead, 0.5 to 1.5% iron, 1 to 5% sulfur, 15 to 20% arsenic, 5 to 10% antimony and in oz./ton, about 100 to 500 silver. As noted hereinabove, the speiss typically consists of $Cu_3As$, $Cu_3Sb$ and $Fe_2As$, intermingled with an additional emulsion of very fine PbS-$Cu_2S$ matte particles. Details of a preferred speiss roasting process may be found in the above-noted U.S. application No. 854,237. The speiss is generally granulated and is typically prepared by pouring the molten speiss into water. The resultant speiss particle size varies from a fine powder to about ⅜ inch.

The fume from the roasting process contains most of the arsenic and antimony of the speiss with recoveries of both elements being usually greater than about 70%. Typically the temperature of the roasted speiss is about 660° C., although it could be higher or lower depending on the roasting conditions and speiss being treated.

A sample of speiss obtained from a lead circuit was roasted according to the procedures set forth in U.S. application No. 854,237 and the fume was condensed and collected. The fume was then volatilized using a mass spectrometer and the analysis indicated that $As_4O_6$, $Sb_4O_6$, $As_3SbO_6$, $As_2Sb_2O_6$ and $AsSb_3O_6$ gaseous species were present over the fume sample. It is hypothesized that roasting or other volatilization of arsenic and antimony materials produces a fume containing a number of arsenic and antimony oxide compounds including the heteronuclear species such as $As_3SbO_6$, $As_2Sb_2O_6$ and $AsSb_3O_6$. When the fume is contacted with an oxygen containing gas at a controlled temperature the arsenic and antimony compounds are dissociated into arsenic and antimony oxides which may be separated by, for example, differences in their boiling or condensation point.

The concentration of oxygen in the blended gas mixture may vary widely being greater than about 1% oxygen (by volume), preferably greater than about 5% oxygen.

The contact temperature is generally about 200° to 1550° C., preferably about 250° to 660° C.

The contact time to effect decomposition of the complexes is usually very rapid (e.g., instantaneous) and a time of less than one (1) hour may suitably be employed.

It is an important feature of the invention that the vaporization of antimony from antimony-containing materials may be significantly enhanced by volatilizing the antimony material (e.g., by roasting) in the presence of an arsenic material due to the formation of arsenic-antimony vapor complexes. For example, if the feed material does not contain arsenic, arsenic bearing materials may be added to the antimony bearing material and/or arsenic may be added to the gaseous phase to significantly enhance the vaporization of the antimony. In the blend to be fumed it is preferred that the antimony and arsenic bearing materials be oxides of antimony and arsenic. The volatilization of a material from the solid phase to the gaseous phase can also be termed the Transport Rate which refers to the quantity of material transported to the gas phase per unit time (e.g., milligrams/minute). The following Table, generated by the equipment shown in FIG. 4, demonstrates the enhancement of volatilization of solid $Sb_2O_3$ when heated in an atmosphere containing 1 mm Hg and 10 mm Hg $As_4O_6(g)$ as contrasted with heating in an inert atmosphere such as argon. The increase in volatility of the $Sb_2O_3$ (s) is due to the formation of the arsenic-antimony vapor complexes.

TABLE

| Temperature (°C.) | Inert Gas $Sb_4O_6$ (g) mm Hg | 1 mm Hg $As_4O_6$ (g) | | 10 mm Hg $As_4O_6$ (g) | |
|---|---|---|---|---|---|
| | | *$Sb_4O_6$ (g) mm Hg | % Inc. | *$Sb_4O_6$ (g) mm Hg | % Inc. |
| 427 | 0.004 | 0.35 | 8,888 | 1.52 | 38,770 |
| 527 | 0.254 | 2.13 | 742 | 6.59 | 2,500 |
| 627 | 6.316 | 15.86 | 151 | 31.91 | 405 |

*Apparent vapor pressure of $Sb_2O_3$ (s).

Other arsenic and antimony containing materials such as copper converter cottrell dust, fume and dust from the roasting of copper concentrates and refinery, e.g., lead refinery by-product dusts, may also be fumed and treated using the process of the invention. In general, any arsenic and antimony containing materials which when heated form an arsenic and antimony containing fume may be used. As noted above in the Table, even antimony containing materials may be treated according to the invention if arsenic is present in the gaseous phase.

With reference to FIG. 1, an ore concentrate obtained from lead ore is charged to a sinter machine to remove sulfur and form lead oxide. The sinter is then fed to a blast furnace with flux and fuel and heated at a high temperature to form molten lead bullion and a slag. The bullion as it flows from the furnace contains alloyed metallic impurities and is drossed as shown in U.S. Pat. No. 4,404,026, supra, to form matte and speiss phases and slag, with the matte phase being delivered to the copper circuit at the converter stage.

Following the prior art process as shown by the dotted line, the speiss is added directly to the copper circuit in the copper roaster stage. In the improved process of the invention, calcine containing significantly less arsenic and antimony copper circuit impurities. The speiss calcine, as with the matte phase, may be added to the copper converter stage.

The speiss fume is subjected to the temperature controlled oxidation process of the invention to produce separable arsenic and antimony compounds. Any residue may be recycled to the sinter machine or blast furnace.

The following examples are given for purposes of illustration only and are not to be considered as constituting a limitation on the present invention.

EXAMPLE I

Figure 3:
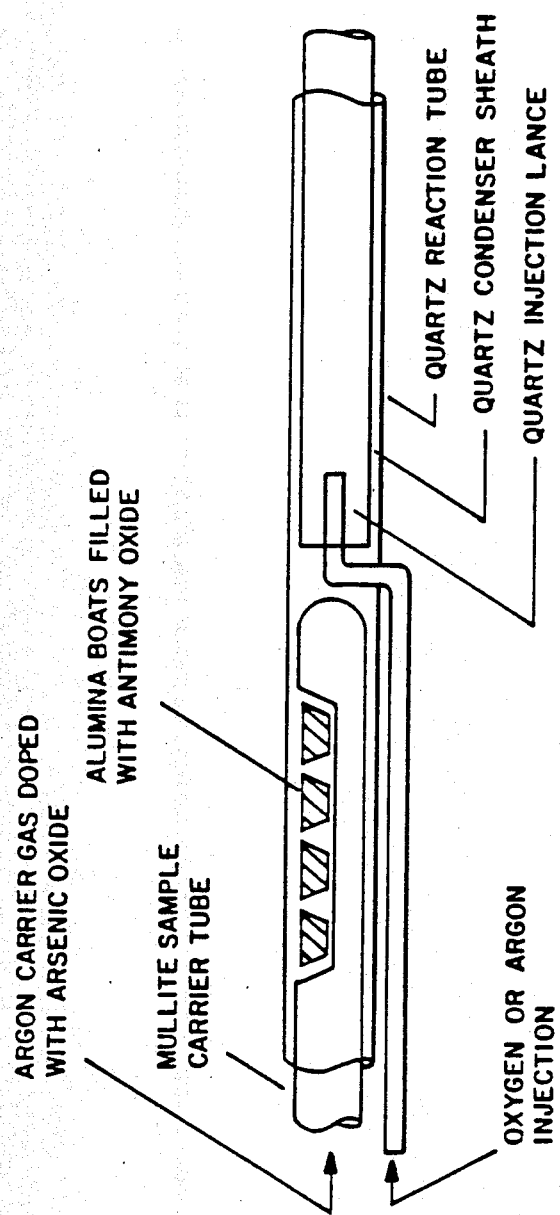
FIGS. 3 and 4 are side-views of apparatus for measuring the results of the process of the invention.

Using the apparatus of FIG. 3, high purity $As_2O_3$ (99.999%) was heated at a temperature of 220° C. to form a vapor of $As_4O_6$ which was mixed with argon as a carrier gas. The arsenic-argon gas stream at a temperature of about 630° C. was passed through a cylindrical quartz reaction tube over pure solid $Sb_2O_3$ (99.999%) which was being vaporized at a temperature of about 630° C. The vapor mixture at a temperature of about 630° C. formed complex oxides of $As_3SbO_6(g)$, $As_2Sb_2O_6(g)$ and $AsSb_3O_6(g)$ and was passed into a quartz condenser sheath inserted in the quartz reaction tube. The condenser sheath had a quartz injection lance inserted in the sheath which was used to inject the oxidizing gas into the arsenic-antimony vapor stream.

After equilibrium was established, the flow rate of oxygen was adjusted to provide a 50% v/v oxygen-argon mixture at the entrance to the condenser. The temperature of the oxygen-argon mixture was 600° C. and the volume % of oxygen in the total gas stream is about 50%.

The results of the oxidation shows decomposition of the vapor complexes into solid $Sb_2O_3$, $Sb_2O_4$ and $As_2O_3$. The antimony compounds were readily separated from the $As_2O_3$ by condensation on the quartz condenser sheath. Over 98% of the total arsenic condensed in the cold (end) zone of the condenser and over 95% of the total antimony condensed in the hot (front) zone of the condenser.

EXAMPLE II

Figure 2:
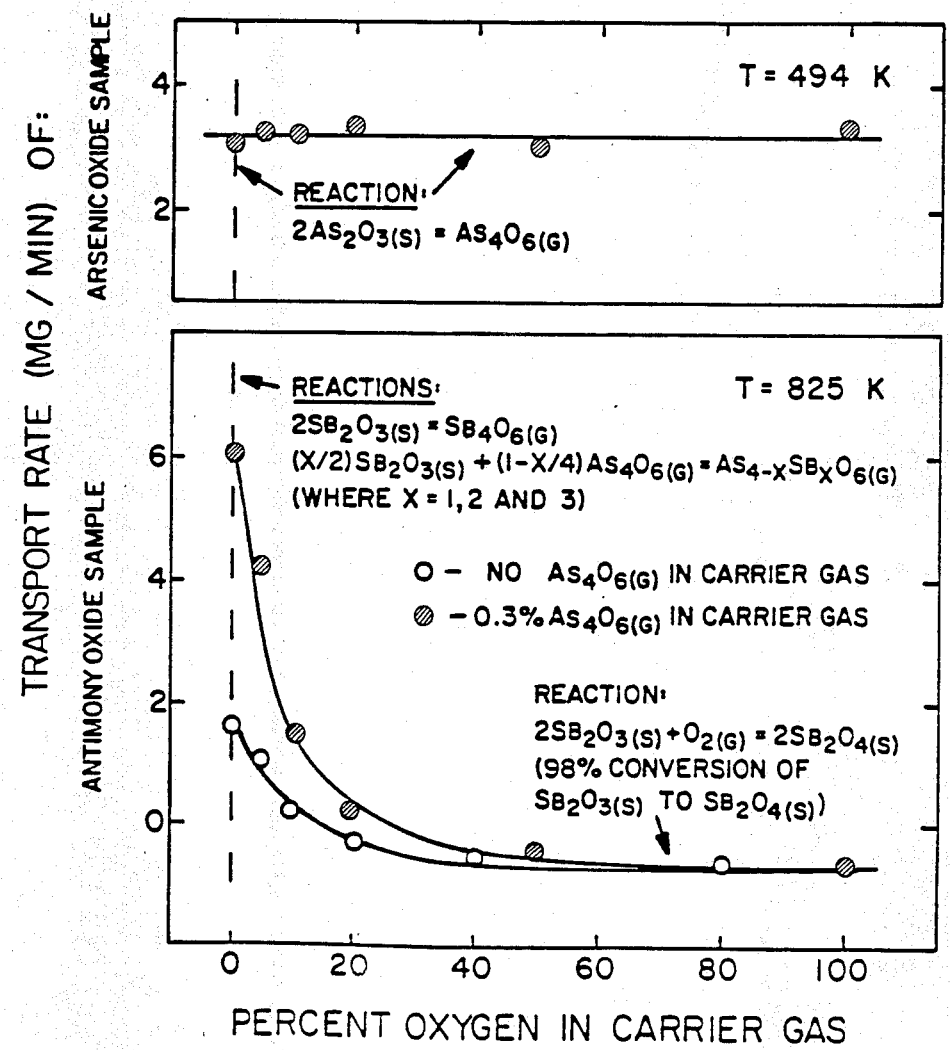
FIG. 2 is a graph showing the effect of oxygen on the Transport Rate of arsenic and antimony.
Figure 4:
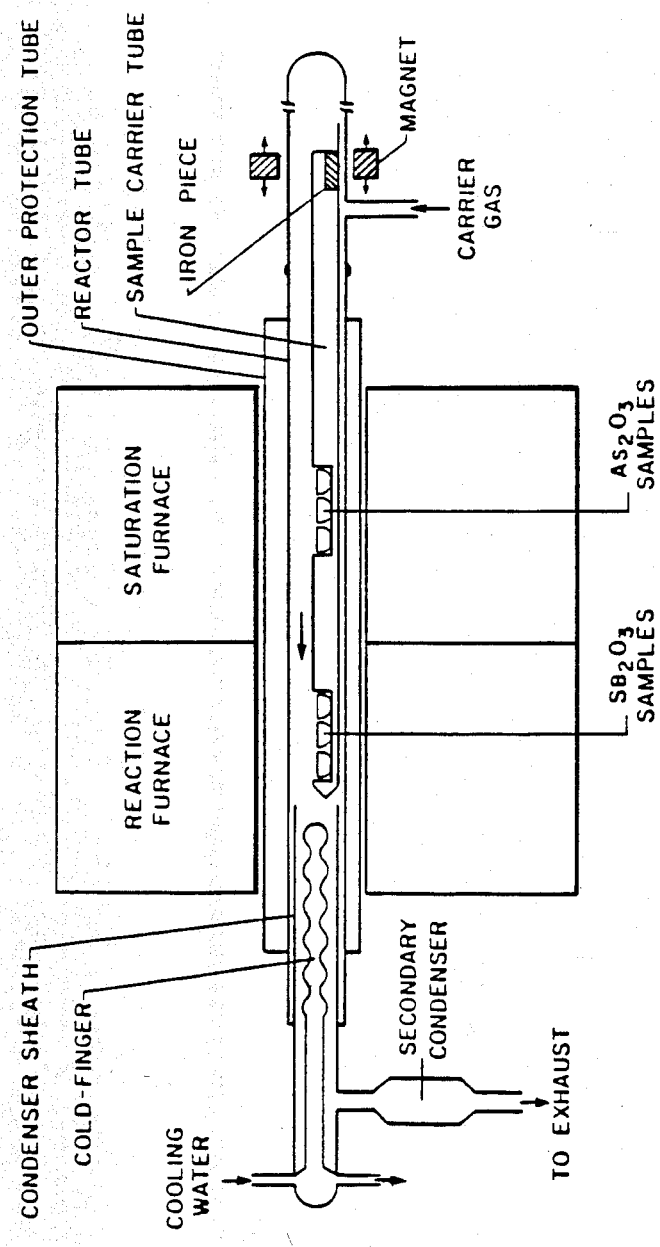

To study the effect of oxygen on the stability of the $As_xSb_yO_6(g)$ complexes, oxygen was added to the carrier gas stream at the inlet end of the reactor tube of FIG. 4. The experiments were conducted with and without the addition of $As_4O_6(g)$ to the carrier gas. The results given in FIG. 2 show that in the absence of $As_4O_6(g)$, the addition of oxygen decreases the volatility of the $Sb_2O_3$ sample and that a weight gain occurs due to the conversion of $Sb_2O_3$ to $Sb_2O_4$. In the presence of $As_4O_6(g)$, but no oxygen, the complexes are formed. However, the ability to form the vapor complexes is decreased as the level of oxygen is increased. On the other hand, the equilibrium partial pressure of $As_4O_6(g)$ is maintained in the carrier gas. The role of oxygen in this series of experiments was to convert the $Sb_2O_3(s)$ to $Sb_2O_4(s)$, which has a very low vapor pressure and which will not react with $As_4O_6(g)$ to form vapor complexes, and at the same time not react with the $As_2O_3(s)$. These findings lead to the conclusion that if the vapor complexes are formed under neutral conditions, then oxygen could be added to the product gas mixture to separate the antimony into $Sb_2O_3$ and $Sb_2O_4$, which would condense out at high temperatures, and the arsenic into $As_2O_3$, which would condense out at much lower temperatures.

It will be apparent that many changes and modifications of the several features described herein may be made without departing from the spirit and scope of the invention. It is therefore apparent that the foregoing description is by way of illustration of the invention rather than limitation of the invention.

We claim:
1. A process for separating arsenic from antimony from a fume produced by the volatilization of a mixture of speiss, a sulfur source and a carbon source comprising;
   (a) contacting the fume with an oxygen containing gas for a sufficient time at an elevated temperature to form arsenic and antimony compounds having different boiling points;
   (b) separating the arsenic compounds from the antimony compounds.
2. The process of claim 1 wherein the temperature is about 200° to 1550° C. and the contact time is greater than about 30 minutes.
3. The process of claim 1 wherein the speiss is drossed lead bullion speiss.
4. A process for the separation of arsenic and antimony from speiss comprising:
   (a) forming a mixture of the speiss, a sulfur source and a carbon source;
   (b) heating the mixture at an elevated temperature to volatilize the arsenic and antimony and to form a speiss calcine;
   (c) separating the volatilized arsenic and antimony from the heated mixture, the speiss calcine having a reduced arsenic and antimony content;
   (d) contacting the volatilized arsenic and antimony with an oxygen containing gas; and
   (e) separating the arsenic from the antimony.
5. The process of claim 4 wherein the arsenic is separated from the antimony in step (e) by condensation.
6. The process of claim 4 wherein the speiss is drossed lead bullion speiss.

* * * * *